(12) United States Patent
Münster et al.

(10) Patent No.: US 8,986,826 B2
(45) Date of Patent: Mar. 24, 2015

(54) POLYVINYLIDENE CHLORIDE COATING, PROCESS FOR PRODUCING A COATING AND USE THEREOF

(75) Inventors: Jochen Münster, Zielebach (CH); Hans-Jörg Jenni, Biel (CH)

(73) Assignee: Kloeckner Pentaplast GmbH & Co. KG, Heiligenroth (DE)

( * ) Notice: Subject to any disclaimer, the term of this patent is extended or adjusted under 35 U.S.C. 154(b) by 410 days.

(21) Appl. No.: 11/630,061

(22) PCT Filed: Jun. 21, 2005

(86) PCT No.: PCT/EP2005/006665
§ 371 (c)(1),
(2), (4) Date: Dec. 18, 2006

(87) PCT Pub. No.: WO2006/000375
PCT Pub. Date: Jan. 5, 2006

(65) Prior Publication Data
US 2008/0090090 A1    Apr. 17, 2008

(30) Foreign Application Priority Data

Jun. 26, 2004 (DE) .................. 10 2004 030 981

(51) Int. Cl.
*C09D 127/08* (2006.01)
*C08J 7/04* (2006.01)
(Continued)

(52) U.S. Cl.
CPC ............. *C08J 7/047* (2013.01); *B29K 2027/08* (2013.01); *C08J 2327/04* (2013.01); *C08J 2427/00* (2013.01); *C08L 27/08* (2013.01); *C09D 127/08* (2013.01)
USPC .......................................... 428/323; 428/518

(58) Field of Classification Search
CPC .... C09D 127/04; C09D 127/08; C08L 27/04; C08L 27/08; B29K 2027/08; C08F 14/04; C08F 14/08
USPC .................................................. 428/323, 518
See application file for complete search history.

(56) References Cited

U.S. PATENT DOCUMENTS 3,014,004 A * 12/1961 Meier ........................... 428/483
3,250,639 A * 5/1966 Stead ............................ 428/349

(Continued)

FOREIGN PATENT DOCUMENTS

CA           919828 A  *  1/1973
DE           15 19 433       8/1970 ............... C09D 3/48

(Continued)

OTHER PUBLICATIONS

Strong, Plastics Materials and Processing, 2000, Prentice-Hall, Inc., p. 198.*

(Continued)

*Primary Examiner* — Elizabeth A Robinson
(74) *Attorney, Agent, or Firm* — ProPat, L.L.C.

(57) ABSTRACT

A coating 8 made of polyvinylidene chloride contains particles 12 made of HDPE. Other particles can also be embedded in the coating, such as polymers from the group LDPE, LLDPE, PP, PVDC, PVC, polyamides, polyurethanes, polyacrylates, polystyrenes, acrylonitrile-butadiene styrene polymerizates (ABS), PTFE, hard waxes, synthetic resins, as well as mixtures and copolymerizates thereof. The coating 8 is applied to a film 9 of a composite which features a carrier film 11, to which the film 9 is laminated by means of an adhesion promoter 10 (FIG. 2).

16 Claims, 1 Drawing Sheet

Figure 1:
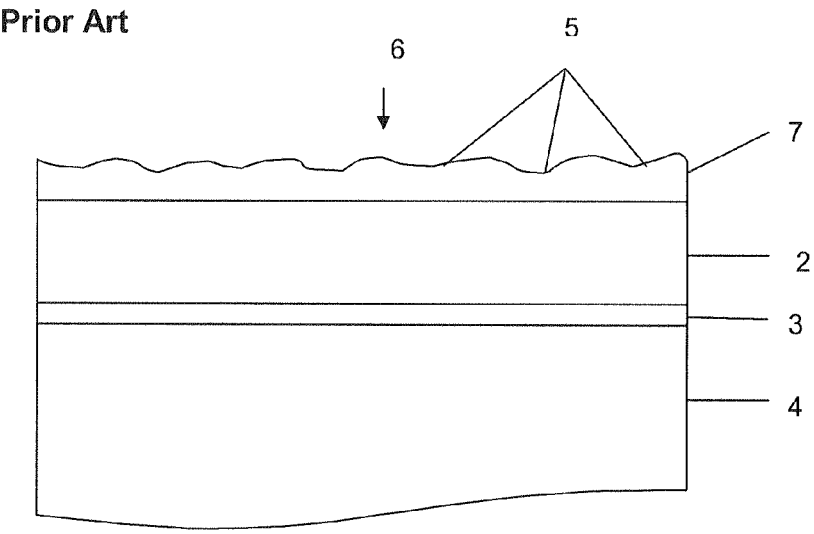

(51) Int. Cl.
*C08L 27/08* (2006.01)
*B29K 27/00* (2006.01)

(56) References Cited

U.S. PATENT DOCUMENTS

| | | | | |
|---|---|---|---|---|
| 3,755,238 A | * | 8/1973 | Wiita | 524/523 |
| 3,876,578 A | * | 4/1975 | Takada et al. | 524/501 |
| 3,891,598 A | | 6/1975 | Marzolf | 260/42.56 |
| 4,151,149 A | * | 4/1979 | Smith | 524/817 |
| 4,795,665 A | * | 1/1989 | Lancaster et al. | 428/34.2 |
| 6,019,922 A | * | 2/2000 | Hassan et al. | 264/130 |
| 6,706,389 B1 | * | 3/2004 | Bates et al. | 428/349 |
| 2006/0068183 A1 | * | 3/2006 | Nelson et al. | 428/220 |

FOREIGN PATENT DOCUMENTS

| | | | | |
|---|---|---|---|---|
| DE | 20 12 349 | | 10/1971 | C09D 5/02 |
| DE | 43 16 025 A1 | | 1/1994 | B01J 2/30 |
| DE | 198 32 500 A1 | | 1/2000 | C08L 45/00 |
| DE | 100 64 800 A1 | | 6/2002 | C08F 10/02 |
| GB | 2060655 | | 5/1981 | |
| JP | 56-055448 A | | 5/1981 | |
| JP | 57-059756 | | 4/1982 | |
| JP | 57-059757 | | 4/1982 | |
| WO | WO 89/08680 A1 | | 9/1989 | C08K 5/02 |
| WO | WO 91/03518 A1 | | 3/1991 | C08K 5/15 |
| WO | WO 95/17465 | | 6/1995 | C08K 13/00 |

OTHER PUBLICATIONS

ACumist® B-6 Technical Data sheet, 2002, downloaded from www.acwax.com.*

Strong, Plastic Materials and Processing—Thermoset Materials section, 2000, Prentice-Hall, Inc., Second Edition, pp. 263-264.*

Oxford English Dictionary—Resin definition, Third edition, Mar. 2010; online version Mar. 2012, Oxford University Press, pp. 1-12.*

* cited by examiner

POLYVINYLIDENE CHLORIDE COATING, PROCESS FOR PRODUCING A COATING AND USE THEREOF

CROSS-REFERENCE TO RELATED APPLICATIONS

This application is being filed under Rule 1.371 as a National Stage Application of pending International Application No. PCT/EP2005/006665 filed Jun. 21, 2005, which claims priority to the following parent application: German Patent Application No. 10 2004 030 981.7, filed Jun. 26, 2004. Both International Application No. PCT/EP2005/006665 and German Patent Application No. 10 2004 030 981.7 are hereby incorporated by reference herein in their entirety.

FIELD OF THE INVENTION

The invention relates to a film on the basis of polyvinylidene chloride sheet-formed materials, a process for the manufacture of a coating and its use.

BACKGROUND OF THE INVENTION

Multi-layer composites, below designated as "composites" or "composite films," are used for such things as packaging foods and pharmaceutical products. Frequently the top film or layer of such composites is coated with vinylidene chloride polymer- or copolymer dispersions. For example for the packaging of pharmaceutical products, PVC films or PVC-PE composite films are coated with vinylidene chloride copolymer dispersions and subsequently processed in a thermoforming process into blisters, which are then filled with packing products and are sealed shut with an aluminum foil or a thin polymer cover film. Vinylidene chloride monomers are usually polymerized into copolymers with methacrylates, acrylates, vinyl chloride or acrylonitrile. The purpose of the vinylidene chloride copolymer coating is to form a sealable coating and/or formation of a barrier layer against vapor, oxygen and aromas.

Vinylidene chloride copolymer dispersions form plastic films which feature, when in a fresh condition, and especially if they contain no wax or other lubricant additive, for one a blocking tendency, i.e. a tendency to adhere to a smooth surface, such as the nearest wrap of a film roll, and, for another, very high coefficients of static friction and sliding friction in relation to metals, plastics and organic materials. The coefficients of sliding friction may be reduced after the surface of the PVDC coating has become harder due to more or less quickly on-setting and progressing crystallization. But a tendency to adhere to machine parts, or to poor sliding characteristics when being filled with packing goods, especially with gelatin capsules, remains undiminished. A tendency to unwanted sticking of the PVDC layer to hot machine parts, for example in the heating zone of thermoforming machines, has also been observed.

After the composite film is wrapped the blocking tendency results in the creation of dabbing spots on the soft PVDC surface caused by contact with the adjacent wrap of film. If the PVDC surface is very smooth, as in the case of the screen cylinder or tri-helix roller coating systems usually used for PVDC dispersion coating, if no counteractive measures are taken, the air wrapped over results in large zones with a glossy surface, since the contact with the adjacent wrap is prevented by enclosed air bubbles. Adjacent to these are zones with a matt surface which are in contact with the adjacent wrap and in which, as a result, dabbing spots occur. The dabbing images themselves do not result in a technical fault in the PVDC coating, but such composites are frequently not accepted on aesthetic grounds. However, in many cases, PVDC coated films can also develop an unwanted film deformation, possibly leading to secondary faults due to the wrapped over air bubbles.

Generally this air-enclosure effect is reduced by applying a specific surface structure permitting the air to escape from the sides. Also the dabbing spots, due to the fact that they basically always appear on the wave crests of the surface structure, are distributed evenly across the whole surface of the film, and the film acquires in this manner a more homogenous appearance.

The specific generation of such a surface structure determines the use of additional equipment in a coating machine. The quality of the structure, i.e. the roughness height, appearance, the mean layer thickness of the top layer of the composite, must be controlled by machine settings and, in general, in comparison to a smooth film surface, the generation of a surface structure is accompanied by a loss in film thickness and, thus, by a possible loss in productivity. Due to the surface unevenness, the application of a surface structure onto a PVDC coated film is a disadvantage, or even impossible, if the coated composite is subjected to an additional lamination or coating step on the PVDC side.

Freshly coated and wrapped composite film rolls relax over a period of a few hours or days, in that they collapse somewhat in those sections which are wrapped less tightly, or at places where the film is less thick, and draw tight at places characterized by greater film thickness. One result of the block tendency of the freshly coated PVDCs consists in the fact that, due to the insufficient sliding capacity between the film wraps and to the simultaneous relaxing, tension arises along the film surface which, if the block tendency is too pronounced, can even lead to material destruction caused by the breaking of the composite films into the individual films or layers.

In DE 100 64 800 A1 micronized polyethylene waxes are described which are manufactured by the co-polymerization of ethylene under high-pressure conditions using an aliphatic or aliclycic ketone as molecular weight regulator and subsequent micronization. What is meant by micronization is the breaking up of substances into particle sizes ranging from 1 μm to a maximum of 100 μm. The substances are rendered into the desired morphology by grinding or spraying. There are numerous applications known for micronized polyethylene waxes, for example as carriers for printing inks, coatings, abrasive for toothpastes, and additive for cosmetic preparations such as eyeshadows, lipsticks, or blusher.

DE 43 16 025 A1 relates to micronized polyethylene wax of a mean particle size of 1 to 30 μm, suitable as a solvent to detackify the surface of sticky granulates. The micronized polyethylene wax develops its effect even in small quantities of 0.01 to 2% by weight of the granulate. The micronized polyethylene waxes are made by spraying a relevant polyethylene melt with gases in a two-stage nozzle.

EP 0 403 542 B1 discloses a polymer composition which comprises a vinylidene chloride interpolymer formed from a monomer mixture. The monomer mixture contains 60 to 99% by weight vinylidene chloride and 40 to 1% by weight of at least one ethylene-type unsaturated comonomer which is copolymerizable with it. The vinylidene chloride interpolymer is mixed with a formulation package which contains 0.1 to 95% by weight in relation to the total weight of the formulation package, an alkali metal salt or an alkaline earth metal salt of a weak acid, an ethylene homopolymer and at least one plasticizer and one lubricant. The vinylidene chloride interpolymer can be used to make objects by casting, blowing, extrusion molding, coextrusion, laminating, or calendering of the polymer compound.

EP 0 736 067 B1 describes a process of stabilizing polyolefin mixtures containing PVDC, and stabilized polyolefin mixtures containing PVDC. The plastic mixture comprises polyolefins and 0.05 to 20% by weight PVDC and at least one organic phosphite or phosphonite as well as at least one metal salt of a fatty acid.

DE 198 32 500 A1 relates to a thermoformable composite film which comprises a film containing at least one cycloolefin copolymer and a thermoplastic film laminated onto at least one side of it. The thermoformable film is laminated to the film containing cycloolefin copolymer by a solvent-free, single-component adhesive. The thermoplastic film contains PVDC. The thickness of the film as a whole is 100 to 500 μm, the thickness of the PVC film ranges from 5 to 150 μm, and the thickness of the COC film is 50 to 400 μm. This thermoformable composite film is used to make blister packs. The thermoplastic film can also be selected from polyolefin, polyamide, polyester, polycarbonate, polystyrene, polyvinyl chloride, and polyurethane.

SUMMARY OF ADVANTAGEOUS EMBODIMENTS OF THE INVENTION

The object of the invention is to create a coating for composites, especially for composite films, which feature low coefficients of static friction and sliding friction for the improvement of the sliding characteristics of the composite film, and to facilitate handling of the composite films to be coated in machines and their finishing in corresponding machines.

DETAILED DESCRIPTION OF THE DRAWINGS

Figure 2:
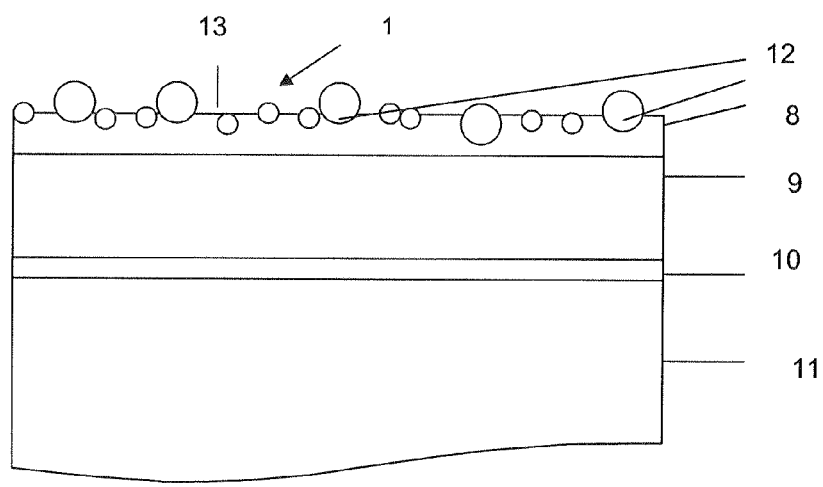

FIG. 1 shows in a schematic sectional view a customary PVDC coating of a composite film consisting of PVDC film/ carrier film with structured PVDC surface, and FIG. 2 shows in a schematic sectional view a coating, according to the invention, consisting of PVDC, mixed with particles, on a composite film made of PVDC film/carrier film.

DETAILED DESCRIPTION OF ADVANTAGEOUS EMBODIMENTS OF THE INVENTION

This object is achieved by a coating on the basis of polyvinylidene chloride for sheet-formed materials in such a manner that particles made of polymers, natural substances, modified natural substances, anorganic materials or mixtures thereof are contained in the polyvinylidene chloride.

The density of the particles in this case is in the range of 0.1 to 2.0 g/cm$^3$ and the mean particle diameter in the range of 1 μm to 100 μm.

For this purpose the largest particle diameter is equal to/greater than the thickness of the PVDC layer.

In one embodiment of the invention the particles are selected from a group comprising HDPE, LDPE, LLDPE, polypropylene, PVDC, PVC, polyamides, polyurethanes, polyacrylates, polystyrenes, polyacrylonitriles, acrylonitrile butadiene styrene (ABS), polytetrafluoroethylene (PTFE), synthetic resins, hard waxes as well as mixtures and copolymerizates thereof.

In further development of the invention the particles have a surface coating made of one of the polymers selected from a group comprising HDPE, LDPE, LLDPE, polypropylene, PVDC, PVC, polyamides, polyurethanes, polyacrylates, polystyrenes, polyacrylonitriles, acrylonitrile butadiene styrene polymerizates (ABS), polytetrafluoroethylene (PTFE), synthetic resins, hard waxes as well as mixtures and copolymerizates thereof.

Further embodiments of the invention include coatings in which the particles have a dry portion from 0.1 to 10 wt % of the PVDC dry weight, more particularly a dry portion of 0.3 to 8 wt % of the PVDC dry weight, such as a dry portion of 0.2 to 2 wt % of the PVDC dry weight. In particular embodiments, the particles are added to the PVDC in powder form. In particular embodiments, the coating is liquid and consists of a mixture of an anionic PVDC dispersion and an anionic dispersion made of micronized particles. The anionic dispersion may consist of micronized particles, one or several emulsifying agents, anionic tensides, pigment dispersers and dispersion additives. The inventive coatings may include particles consisting of HDPE.

The process for the manufacture of such a coating on the basis of polyvinylidene chloride for sheet-formed materials is characterized in that a PVDC dispersion is provided into which the particles are fed directly or into which a particle dispersion is fed while stirring. For this purpose the particle dispersion is prepared by stirring a particle powder into water without, or with one or several emulsifying agents. The particle dispersion preferably has pigment dispersers or other dispersion-promoting additives added to it. In a further embodiment of the process the mixture of PVDC and particle dispersion is applied and dried as the top layer onto a sheet-formed material.

In particular a PVDC dispersion, containing 5 to 80% by weight PVDC, and a particle dispersion, containing 10 to 95% by weight particles, are mixed together.

Further embodiments of the inventive process includes processes in which a PVDC dispersion with 30 to 70 wt % PVDC and a particle dispersion with 40 to 70 wt % particles are mixed together. In particular embodiments, an 80 to 99 wt % PVDC dispersion and a 1 to 20 wt % particle dispersion are mixed together. The particle dispersion may be a PVDC-HDPE dispersion with a dry portion of 0.50 to 3.0 wt % HDPE of the mixture of PVDC and HDPE dispersion.

The coating according to the invention is used to coat plastic films, paper sheets, and metal foils. In particular the coating is used to coat PVC mono-films, multi-layer composites made of PVC and PE, made of PVC-PE composite films and one metal foil, mono-films made of cycloolefin copolymers, as well as composite films made of cycloolefin copolymers with PVC and/or other polymers. Composite films of the kind listed, which are refined after being coated with PVDC by laminating and/or coating, are also used. All the usual polymer films such as PET, PP, PE, acrylates, ABS, PS, cellophane, cellulose acetates, polyamides, polyacrylonitriles, PCTFE etc., and the respective composites made of two or more of the listed polymer films can be outfitted with the coating specified by the invention. Especially preferred is the coating for coating a PVDC layer of a multi-layer composite made of PVDC film, adhesion promoter and carrier film as well as a multi-layer composite made of PVDC film, adhesion promoter, polyethylene, adhesion promoter, and carrier film. By PVDC film is meant a PVDC film onto which PVDC dispersion was already applied as a primer during earlier work steps. Other multi-layer composites with PVDC coated films are PVC/PE/PVDC/PVDC+HDPE/PE/PVC; PVC/COC/PVDC/-PVDC+HDPE; PVC/PVDC/PVDC+HDPE/PE. The coating according to the invention can also be applied to metal foils as well as onto composites made of metal foils and polymer films coated in this manner. In all these applications it is also possible to use the coating according to the invention without a previous coating of primer with unmodified PVDC. Films like these are used in such applications as the manufacture of blister packs.

By embedding polymer particles, preferably of HDPE micronizates, in the top polyvinylidene chloride copolymer layer of composite films, the above described difficulties are eliminated or greatly reduced and the manufacturing process for these composite films is simplified and more efficient. These polymer particles act as spacers between the wraps of a film and improve the sliding characteristics of the PVDC surface of the film sheet.

Polymers in liquid and powder form considered suitable for these particles are those which are highly compatible with the specific PVDC dispersion, are not abrasive, and in particular are not essentially harder than the PVDC coating or the underside of the carrier or base film on which the PVDC coating is applied. If the particles are harder than the other film surfaces of a composite, the surface of the particles must be as smooth as possible and, ideally, spherical. Ideally the particles have as low coefficients of static friction and sliding friction as possible. The particles should not be film-forming at drying temperatures up to 100° C. customary for PVDC drying, and should not "melt" with the PVDC during drying, i.e. should not form a homogenous PVDC/particle polymer film. Instead, the polymer particles from the PVDC layer should protrude and, by doing so, fulfill their function as spacers. In addition, the particle material should be characterized by a refractive index similar to that of PVDC, so that as little clouding as possible occurs in the PVDC particle layer. The density of the particle material is in the range from 0.1 to 2.0 g/cm$^3$, especially in the range of smaller than/equal to 1.30 g/cm$^3$ and it is preferred as smaller than 1 g/cm$^3$, so that its migration to the surface in the particle dispersion, and thus its protrusion out of the PVDC surface, is promoted. For this purpose the largest particle diameter is equal to/larger than the thickness of the coating. The mean particle diameter of the particles must also be made compatible with the application system so that irregularities in the particle contents related to oversized particles or inhomogeneous application cannot arise. So as to not have a negative impact on the barrier effect of the PVDC coating, the particles must not be porous. The barrier effect must be as high as possible in the application area of the composite film or composite.

In principle, as particles, all polymers come into consideration which meet the above conditions either completely or partially, for example: HDPE, LDPE, LLDPE, PP, PVDC, PVC, polyamides, polyurethanes, polyacrylates, polystyrenes, polyacrylonitriles, ABS, PTFE, hard waxes, synthetic resins and others, as well as mixtures and copolymerizates thereof. Particles can also be used which have a suitable surface coating. The core materials of such coated particles are, for example, polymers from the above list as well as natural substances such as cellulose, natural waxes, poly(hydroxyalkanoic acids), shellac, modified natural substances such as casein derivatives and casein condensate, cellulose derivatives such as cellulose acetate and cellulose nitrate or anorganic substances such as silicon dioxide, silicate, aluminum oxide, titanium dioxide. As coating materials the above listed polymers can be used or other, correspondingly suitable surface coatings such as silane, siloxane, ormocer (organically modified ceramic), ceramic materials.

Particles can also be used which are of a purely anorganic nature, such as silicon dioxide, silicate, aluminum oxide, titanium dioxide, and which possess the above listed characteristics.

If the particles have a polymer origin, they can be made by polymerization, polycondensation, polyaddition, polymer analogous implementation or a mixture of prefabricated polymers. The particle form and splitting is normally performed either directly during polymerization, i.e. suspension or emulsion polymerizations, or by a later mechanical splitting and/or suspension and stabilization in a carrier liquid. Anorganic particles can, for example, be ground from natural substances or be made synthetically. Particles like these can be given surface coatings.

When using particles, the particle's proportion of the dry coating is usually in the range of 0.1% by weight to 10% by weight. For particles in the form of HDPE micronizates, for example, a dry percentage of approx. 0.2 to 2% micronizates by weight of dry coating mass proves to be especially effective.

To manufacture such PVDC coatings containing particles the PVDC dispersion is mixed while stirring before application to a sheet-formed material with a corresponding quantity of particle suspension or dispersion until the suspension or dispersion is homogenously mixed with the PVDC dispersion. For this purpose a commercially available non-shearing stirrer is used, for example a propeller stirrer. Subsequently the mixture is applied with an application tool customarily used for PVDC coatings on the material to be coated, and dried. If the particle size has been correctly selected and the compatibility with the PVDC dispersion is given, no difference to the unmodified PVDC dispersion can be identified in terms of coating and/or drying behavior. The finished coated material features the following substantial process and product advantages:

The static and sliding friction of the surface of the coated material is, especially in a freshly coated condition, substantially less than of the unmodified PVDC coating.

The blocking tendency of freshly coated material is, although the PVDC surface is not structured, clearly reduced. In this context what is meant by "non-structured" is a surface from which particles protrude but the surface neither shape or form wave troughs or crests.

Block spotting caused by imprints on the back side of the adjacent film wrap on the film roll are heavily reduced or completely absent.

Despite the absence of surface structuring, the spacer effect of the particles assures that air can escape from the film or material reel. Enclosed air can lead to film or material deformations and, due to the blocking tendency of fresh PVDCs, to an irregularly matt surface of films.

Due to the reduced static friction of the PVDC surface, the shearing forces created by the relaxation movements of the freshly coated roll material, acting parallel to the material surface, can better relax by the sliding of the PVDC surface facing the adjacent film wrap. This prevents material destruction which is brought about on less well sliding PVDC surfaces by the delaminations generated by the shear forces between the PVDC layer and the base carrier.

The frictional resistance of PVDC coated flat films is reduced against the machine parts of thermoforming machines used to manufacture blisters from flat films. This reduces or completely eliminates film constrictions caused by excessive sheet tensions.

The filling of tablet or capsule form packaging goods is substantially improved, since they can slide into the blister cavities better thanks to the heavily reduced coefficients of static friction and sliding friction. Especially gelatin capsules tend not to slide into the cavity when unmodified PVDC is used, to stand on end in the cavity, or even to jump out of the cavity. At the sealing station immediately downstream from the filling station, this leads to gumming up with squashed packing goods and, as a consequence, to long cleaning procedures.

Furthermore, it is advantageous that, on the machine end, additional equipment and special working steps are not necessary for structuring the surface. The surface characteristics are exclusively dependent on the composition, and therefore can be safely adapted and easily reproducible.

By means of the coating, a smooth, flat surface is generated which is aesthetically more attractive than a structured surface.

The flat surface permits setting a larger layer volume for the top PVDC layer than in a structured surface, since the maximum dryable layer thickness in a structured layer is predetermined by highest points of the structure, i.e. the peaks of the wave crests, while in a flat surface, the dryable layer thickness is equally large as the maximum dryable thickness of the structurable layer, but in contrast to this does not have any wave troughs, but possesses a homogenously constant layer thickness.

It is also advantageous that a surface modified in this way proves to slide very easily against the back side of the coated film and against the cavities of the form tool. This leads to the possibility, for one, of depiling with visibly less resistance/expenditure of energy unfilled, completely formed blister films whose cavities interlock, e.g. in the form of trimmed blister format pieces, or for another, the removal of the freshly formed blister cups out of the deep draw tool, under the condition that the modified PVDC side is used on the exterior side of the blister cup. In the first case, this results in faster depiling and thus in an increase in productivity, in the second case it results in disruption-free operation of the blister machine and thus to an increase in output.

The invention is explained in greater detail with regard to the drawings.

FIG. 1 shows in a schematic sectional view a customary PVDC coating of a composite film consisting of PVDC film/carrier film with structured PVDC surface, and FIG. 2 shows in a schematic sectional view a coating, according to the invention, consisting of PVDC, mixed with particles, on a composite film made of PVDC film/carrier film.

The cross-section of the composite film 6 shown in FIG. 1 comprises a carrier or base film 4, an adhesion promoter 3, and a PVDC film 2. The adhesion promoter 3 laminates the PVDC film 2 to the carrier film 4. On the top side of the PVDC film 2 a PVDC coating 7 is applied which features a structured surface 5 so that the layer thickness of the PVDC coating is uneven across the width of the composite film 6 and contains wave crests and wave troughs.

The cross-section of composite film 1 shown in FIG. 2 consists of a carrier or base film 11, an adhesion promoter 10, a PVDC film 9 and a coating 8 made of PVDC in which particles 12 made of HDPE are embedded. The particles 12 have different particle diameters, the average particle size is 6 to 8 μm and is suitable for a HDPE dispersion which leads to a coating with a thickness of up to 6 μm. The largest particles have a diameter of approx. 12 μm.

For a layer thickness of 12 μm the mean particle size is from 12 to 13 μm. The largest particles are approx. 17 μm large. A number of particles 12 protrude out of the flat surface 13 of the coating 8 and act as spacers between the adjacent wraps of a wrapped composite film 1.

Mixture of a PVDC Dispersion with a HDPE Dispersion

The purpose of the following examples is to explain the invention in greater detail without meaning to imply that this restricts the protective scope of the invention characterized in the claims. In each case 1000 l of coating consisting of PVDC dispersion are mixed with a HDPE dispersion, commercially available or freshly prepared. The PVDC dispersion has proportion of 55% by weight PVDC, in relation to the total mass of PVDC dispersion, and a density of 1.29 g/cm$^3$. In the HDPE dispersion, the HDPE portion is 65% by weight of the total mass of HDPE dispersion and the density is 0.96 g/cm$^3$.

The desired amount of PVDC dispersion is put into a 1000 l capacity container and stirred uniformly. The calculated amount of HDPE dispersion is added in a thin stream as the PVDC dispersion is being stirred in a non-foaming manner, and the mixture is stirred for a further 5 to 10 minutes. The HDPE dispersion used can be a ready-made, commercially available dispersion or a freshly prepared dispersing agent of HDPE powder that by corresponding stirring in of the particle power in water, with or without the help of one or several emulsifying agents, of pigment disperser or other disperser additives, of anionic tensides. It is also possible to directly add a HDPE powder into the PVDC dispersion, whereby special attention must be given to the prevention of clump formation which can result in uneven coating thicknesses.

Example 1

The portion of HDPE dispersion was 1% by volume of the total volume (in liters) of the coating. The relevant portions of PVDC and of the HDPEs by weight χ of the dried film are calculated as shown below:

$$\chi_{PVDC} = 100 \cdot \frac{V_{PVDC} \cdot \rho_{PVDC} \cdot FK_{PVDC}}{V_{PVDC} \cdot \rho_{PVDC} \cdot FK_{PVDC} + V_{PE} \cdot \rho_{PE} \cdot FK_{PE}}$$

$$\chi_{PE} = 100 \cdot \frac{V_{PE} \cdot \rho_{PE} \cdot FK_{PE}}{V_{PVDC} \cdot \rho_{PVDC} \cdot FK_{PVDC} + V_{PE} \cdot \rho_{PE} \cdot FK_{PE}}$$

χPVDC PVDC portion of dried coating in % by weight
χPE HDPE portion of the dried coating in % by weight
$V_{PDdC}$ volume of PVDC dispersion used
$V_{PE}$ volume of HDPE dispersion used
ρPVDC density of PVDC dispersion
ρPE density of HDPE dispersion
$FK_{PVDC}$ portion of solids in the PVDC dispersion in % by weight
$FK_{PE}$ portion of solids in the HDPE dispersion in % by weight

| Components | Dispersion Quantity (l) | Portion of dry, χ, wt % |
|---|---|---|
| PVDC dispersion | 990 | 99.12 |
| HDPE dispersion | 10 | 0.88 |

Example 2

The portion of HDPE dispersion was 2% by volume of the total volume (in liters) of the coating

| Components | Dispersion quantity (l) | Portion dry, χ, % wt |
|---|---|---|
| PVDC dispersion | 980 | PVDC 98.24 |
| HDPE dispersion | 20 | HDPE 1.76 |

Below the measured coefficients of static friction and sliding friction of a commonly known composite film with a pure PVDC coating, as described with the help of FIG. 1, are juxtaposed with those of the film according to examples 1 and 2. The frictional force is measured with a test probe made of aluminum coated with hard gelatin.

The measurement conditions were as follows:

| | |
|---|---|
| Test probe speed: | 5 mm/min |
| Mass of test probe: | 200 g |
| Material: | aluminum, anodized |
| Coating on test probe: | hard gelatin |
| Air humidity: | 50% RH |
| Method: | analogous ASTM D 1894 |
| Age of PVDC coatings of three films each: | 10 days |

| Material | Static friction coefficient | Sliding friction coefficient |
|---|---|---|
| PVDC without particles but with surface structure | 1.04 | Not measurable since one continuous movement does not occur |
| PVDC with 1% vol HDPE | 0.41 | 0.21 |
| PVDC with 2% vol HDPE | 0.29 | 0.19 |

A strong indirect dependency is visible of the coefficients of static friction on the portion of HDPE in the coating according to the invention. As the portion of HDPE increases, the coefficient of static friction drops. With the formula $((HRK_{OP}-HRK_P)/HRK_{OP}) \times 100\%$, in which $HRK_{OP}$ is the coefficient of static friction of the composite film coated with PVDC without particles in the PVDC coating, and $HRK_P$ is the coefficient of static friction of the composite film coated with PVDC with particles in the PVDC coating, the coefficients of static friction $HRK_P$ are reduced by 61% and 72% with a HDPE portion by volume of 1% and/or 2%.

Processing the Composite Films

During processing the following advantages are achieved in comparison to PVDC coatings which contain no particles:
- Better removal of the blister from the deep draw mold when the PVDC-coated composite film with PVDC coating is processed from the outside.
- Less constriction of the film sheet due to low frictional resistance against machine parts.
- Better filling characteristics of gelatin capsules in blister packs made from the composite films (PVDC side towards the packing goods).
- Lesser tendency of the composite films to stick fast to hot machine parts.

The invention claimed is:

1. A coating on plastic films, paper sheets, or metal foils, said coating comprising polyvinylidene chloride which further contains particles, wherein (i) a number of particles protrudes out of the coating and forms spacers and the density of the particles is in the range of 0.1 to 2.0 g/cm³, (ii) the largest particle diameter is equal to/larger than the thickness of the coating, and (iii) the particles consist of HDPE, in an amount ranging from 0.2 to 2% by weight of dry coating mass.

2. A coating, as claimed in claim 1, wherein said coating is applied to a multiple layer composite made of PVC-PE composite films and one metal foil.

3. A coating as claimed in claim 1, wherein said coating is applied to a PVDC film of multilayer composites consisting of PVDC film, adhesion promoter, carrier film; PVDC film, adhesion promoter, polyethylene film, adhesion promoter, carrier film; PVDC film, adhesion promoter, cycloolefin copolymer, adhesion promoter, PVC; or PVDC film, adhesion promoter, PE, adhesion promoter, PVC.

4. Coating according to claim 1, wherein the particles have a dry portion of from 0.1 to 10 wt % of the PVDC dry weight.

5. Coating according to claim 1, wherein the particles have a dry portion of from 0.3 to 8 wt % of the PVDC dry weight.

6. Coating according to claim 1, wherein the particles feature a dry portion of 0.2 to 2 wt % of the PVDC dry weight.

7. Coating according to claim 1, wherein the particles in powder form are added to the PVDC.

8. Coating according to claim 1, wherein said coating is liquid and consists of a mixture of an anionic PVDC dispersion and an anionic dispersion made of micronized particles.

9. Coating according to claim 1, wherein the largest particle diameter is larger than the thickness of the coating.

10. A coating on a PVDC layer, said coating comprising a polyvinylidene chloride which further contains particles consisting of (i) polymers or (ii) particles having, a surface coating consisting of polymers, wherein a number of particles protrudes out of the coating and forms spacers,
said coating is directly disposed on said PVDC layer,
and the polymer consists of HDPE, polyurethanes, acrylonitrile butadiene styrene polymerizates, polytetrafluoroethylene, had waxes, as well as mixtures and copolymerizates thereof.

11. Coating according to claim 10, wherein the particles are particles having a surface coating consisting of HDPE, polyurethanes, acrylonitrile butadiene styrene polymerizates, polytetrafluoroethylene, had waxes, as well as mixtures and copolymerizates thereof.

12. A coating as claimed in claim 10, wherein the particles are polymer consisting of HDPE, polyurethanes, acrylonitrile butadiene-styrene polymerizates, polytetrafluoroethylene, hard waxes or mixtures thereof.

13. A coating on a PVDC layer, said coating comprising a polyvinylidene chloride which further contains (i) particles consisting of polymers or (ii) particles having a surface coating consisting of polymers, wherein a number of particles protrudes out of the coating and forms spacers,
said coating is directly disposed on said PVDC layer,
the particles are HDPE and the mean diameter of said particles is in the range from 6 μm to 13 μm.

14. A coating directly contacting a PVDC layer, said coating consisting of polyvinylidene chloride which farther contains particles consisting of HDPE, a number of particles protruding out of the coating and forming spacers,
wherein said coating includes an anionic dispersion and the anionic dispersion consists of micronized particles, one or several emulsifying agents, anionic tensides, pigment dispersers and dispersion additives.

15. A coating directly contacting a PVDC layer, said coating consisting of polyvinylidene chloride, particles, and optionally (i) one or several emulsifying agents, (ii) pigment dispersers or (in) other dispersion-promoting additives,
wherein a number of particles protrudes out of the coating and forms spacers and the particles consist of HDPE, LDPE, LLDPE, PTFE, polypropylene, polyurethanes, acrylonitrile butadiene styrene polymerizates, hard waxes, as well as mixtures and copolymerizates thereof.

16. A composite film consisting of a carrier film, an adhesion promoter, PVDC film and a coating made of PVDC, wherein the PVDC coating comprises particles consisting of polymers, hard waxes, or mixtures thereof,
the mean particle diameter is in the range from 1 μm to 100 μm; a number of particles protrude out of the coating and form spacers and the largest particle diameter is equal to or larger than the thickness of the PVDC coating,
and the particles made of polymer consist of HDPE, polyurethanes, acrylonitrile butadiene styrene polymerizates, polytetrafluoroethylene, hard waxes, as well as mixtures and copolymerizates thereof.

* * * * *

UNITED STATES PATENT AND TRADEMARK OFFICE
CERTIFICATE OF CORRECTION

PATENT NO. : 8,986,826 B2  
APPLICATION NO. : 11/630061  
DATED : March 24, 2015  
INVENTOR(S) : Münster et al.

Page 1 of 1

It is certified that error appears in the above-identified patent and that said Letters Patent is hereby corrected as shown below:

In the Claims

Column 10, Line 30, delete "had" insert --hard--  
Column 10, Line 35, delete "had" insert --hard--  
Column 10, Line 50, delete "farther" insert --further--  
Column 10, Line 60, delete "(in)" insert --(iii)--

Signed and Sealed this  
Eighth Day of September, 2015

Michelle K. Lee  
*Director of the United States Patent and Trademark Office*